US012559348B2

(12) United States Patent
Inata

(10) Patent No.: US 12,559,348 B2
(45) Date of Patent: Feb. 24, 2026

(54) NOTIFICATION CONTROL DEVICE

(71) Applicant: Mitsubishi Electric Corporation, Tokyo (JP)

(72) Inventor: Masayuki Inata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 1514 days.

(21) Appl. No.: 17/052,567

(22) PCT Filed: Jun. 28, 2018

(86) PCT No.: PCT/JP2018/024639
§ 371 (c)(1),
(2) Date: Nov. 3, 2020

(87) PCT Pub. No.: WO2020/003449
PCT Pub. Date: Jan. 2, 2020

(65) Prior Publication Data
US 2021/0238008 A1     Aug. 5, 2021

(51) Int. Cl.
B66B 5/00          (2006.01)
B66B 1/46          (2006.01)
(Continued)

(52) U.S. Cl.
CPC .............. B66B 5/0012 (2013.01); B66B 1/46 (2013.01); B66B 3/002 (2013.01); G06V 40/10 (2022.01); G10L 15/005 (2013.01); G10L 15/22 (2013.01); B66B 2201/463 (2013.01); B66B 2201/4638 (2013.01); B66B 2201/4646 (2013.01); G06V 40/161 (2022.01); G06V 40/178 (2022.01); G10L 2015/223 (2013.01)

(58) Field of Classification Search
CPC ......... B66B 5/0012; B66B 1/46; B66B 3/002; B66B 2201/463; B66B 2201/4638; B66B 2201/4646; B66B 3/00; G06V 40/10; G06V 40/178
See application file for complete search history.

(56) References Cited

U.S. PATENT DOCUMENTS

| 10,055,657 | B2 * | 8/2018 | Fang | B66B 3/02 |
| 2020/0299099 | A1 * | 9/2020 | Hatori | B66B 3/00 |
| 2021/0024326 | A1 * | 1/2021 | Polak | B66B 5/0012 |

FOREIGN PATENT DOCUMENTS

| JP | 6-1549 A | 1/1994 |
| JP | 8-268658 A | 10/1996 |

(Continued)

OTHER PUBLICATIONS

International Search Report and Written Opinion mailed on Aug. 7, 2018 for PCT/JP2018/024639 filed on Jun. 28, 2018, 10 pages including English Translation of the International Search Report.

*Primary Examiner* — Bickey Dhakal
(74) *Attorney, Agent, or Firm* — XSENSUS LLP

(57)          ABSTRACT

A notification control device includes an attribute identification unit configured to identify a physical attribute of a user who uses an elevator, and a notification control unit configured to control, based on the physical attribute identified by the attribute identification unit, a notification speed at which information is provided by a notification device installed in a car in which the user having the identified physical attribute is to ride.

20 Claims, 4 Drawing Sheets

(51) Int. Cl.
    *B66B 3/00*           (2006.01)
    *G06V 40/10*        (2022.01)
    *G06V 40/16*        (2022.01)
    *G10L 15/00*        (2013.01)
    *G10L 15/22*        (2006.01)

(56)           References Cited

FOREIGN PATENT DOCUMENTS

| JP | 2001-5487 | A | 1/2001 |
| JP | 2016-3107 | A | 1/2016 |
| JP | 2017-214165 | A | 12/2017 |
| WO | 2018/025376 | A1 | 2/2018 |

* cited by examiner

NOTIFICATION CONTROL DEVICE

CROSS-REFERENCE TO RELATED APPLICATION

The present application is based on PCT filing PCT/JP2018/024639, filed Jun. 28, 2018, the entire contents of which are incorporated herein by reference.

TECHNICAL FIELD

The present invention relates to a notification control device to be used for an elevator.

BACKGROUND ART

A speaker, a display, or other devices are installed in a car for accommodating a user of an elevator as a notification device for providing information. Hitherto, the manner of providing information using the notification device has been controlled to realize an environment in which the user can use an elevator more comfortably. For example, a voice recognition technology is used to determine the type of language spoken by a user, and the type of language to be used for providing information is automatically switched depending on the result of determination (e.g., refer to Patent Literature 1).

CITATION LIST

Patent Literature

[PTL 1] JP 8-268658 A

SUMMARY OF INVENTION

Technical Problem

A manner of providing information that is desirable to the user differs depending on the type of language to be used. On the basis of this fact, it is possible to classify a user depending on the type of language to be used. However, an attribute for classifying a user is not limited to the type of language. Thus, it is considered that attributes other than the language to be used are also required to be considered in order to realize the environment in which an elevator is used comfortably.

The present invention has been made to solve the above-mentioned problem, and has an object to provide a notification control device capable of providing information more desirably for a user of an elevator.

Solution to Problem

According to one embodiment of the present invention, there is provided a notification control device including: an attribute identification unit configured to identify a physical attribute of a user who uses an elevator; and a notification control unit configured to control, based on the physical attribute identified by the attribute identification unit, a notification speed at which information is provided by a notification device installed in a car in which the user having the identified physical attribute is to ride.

Advantageous Effects of Invention

According to the present invention, it is possible to provide information more desirably for the user of the elevator.

DESCRIPTION OF EMBODIMENTS

Now, a notification control device according to each embodiment of the present invention is described with reference to the drawings.

First Embodiment

Figure 1:
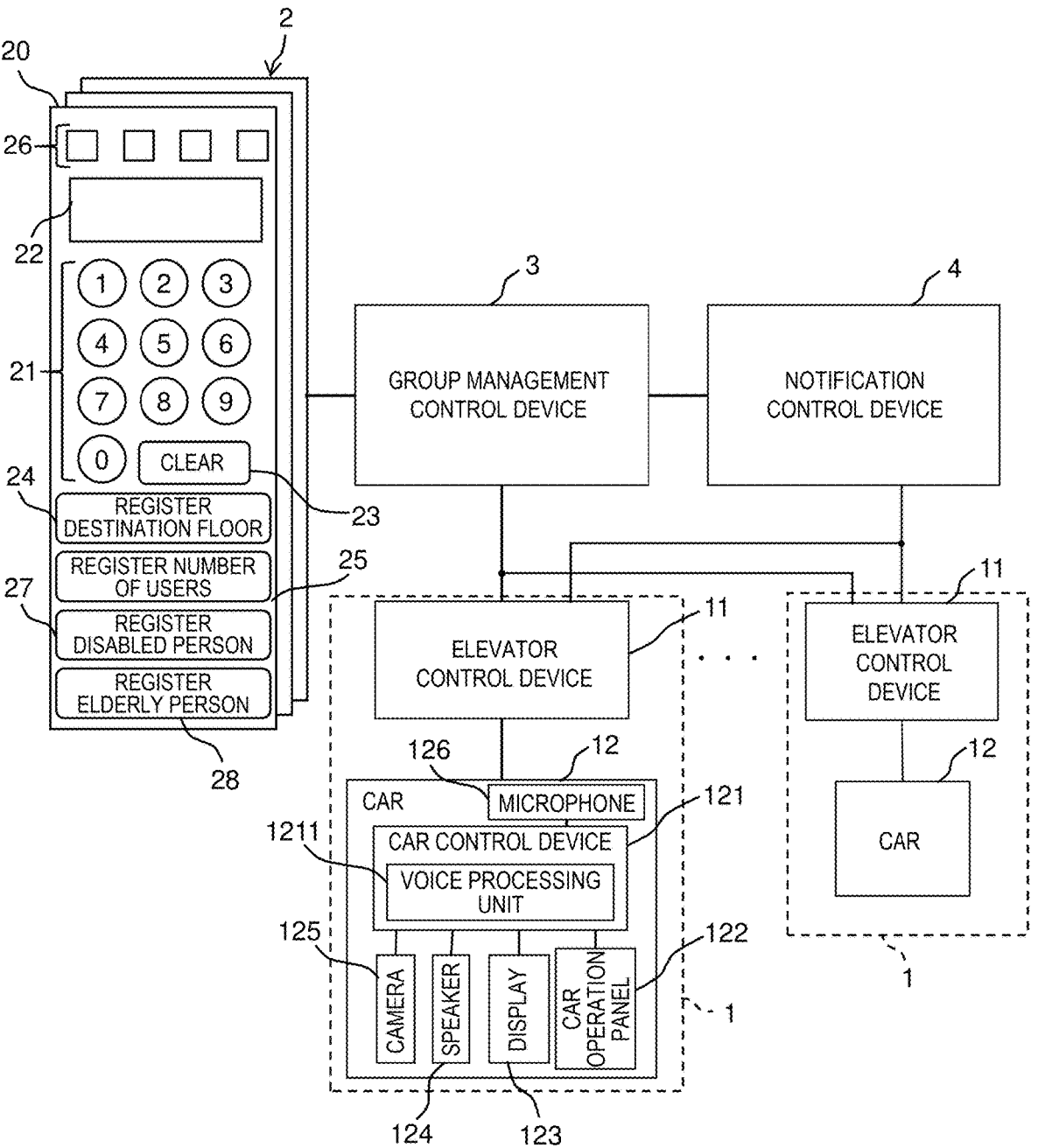
FIG. 1 is a diagram for illustrating an example of a configuration of an elevator system constructed by using a notification control device according to a first embodiment of the present invention.

FIG. 1 is a diagram for illustrating an example of a configuration of an elevator system constructed by using a notification control device according to a first embodiment of the present invention.

This elevator system is a system constructed to operate a plurality of elevators 1. As illustrated in FIG. 1, the elevator system includes the plurality of elevators 1, a hall operation panel group 2 being hall operation panels 20 installed in respective halls, a group management control device 3, and a notification control device 4.

Each hall operation panel 20 forming the hall operation panel group 2 is used to allow a user to register a destination floor before riding the elevator. Each hall operation panel 20 includes numeric keys 21, a display device 22, a "clear" button 23, a "register destination floor" button 24, a "register number of users" button 25, a language selection button 26, a "register disabled person" button 27, and a "register elderly person" button 28. This hall operation panel 20 is only one example, and is not limited thereto.

The numeric keys 21 are used for inputting a destination floor to be registered, the number of users to be registered, and other information. The "clear" button 23 is a button for instructing to delete input details. A numerical value input through operation of the numeric keys 21 is displayed on the display device 22, and the displayed details are deleted through operation of the "clear" button 23.

The "register destination floor" button 24 is a button for registering the input numerical value as the destination floor. For example, after the user has operated the numeric keys 21 to input a numerical value specifying the destination floor, the user can operate the "register destination floor" button 24 to register the destination floor.

The "register number of users" button 25 is a button for registering the number of users who ride the elevator to the registered destination floor. For example, after the user has operated the numeric keys 21 to input a numerical value specifying the number of users, the user can operate the "register number of users" button 25 to register the number of users.

The user of the elevator 1 may be a foreigner. Not all the foreigners always understand Japanese. Thus, in the first embodiment, the user can select the type of language to be used for providing information. The plurality of language selection buttons 26 are buttons that are installed so as to enable the user to select a type of language. The user can operate the language selection button 26 to select the desired type of language.

A disabled person, for example, a visually handicapped person, may use the elevator 1. A large number of such disabled people have a difficulty in performing a prompt action. Further, compared to a healthy person, such a disabled person requires a greater time and effort to perform an action. In view of this, in the first embodiment, an issuance speed being a speed at the time of providing information is controlled so that a disabled person can perform a desired action more appropriately. This issuance speed corresponds to a notification speed.

The "register disabled person" button 27 is a button that is installed to control the issuance speed for a disabled person. In the first embodiment, when this "register disabled person" button 27 is operated, information is provided in such a manner as to cause the issuance speed to be lower than usual and enable a disabled person to understand the information more clearly.

An elderly person may use the elevator 1. Some elderly people also have a difficulty in performing a prompt action. A physical ability of a person tends to decrease as the person ages. In view of this, in the first embodiment, the issuance speed is controlled so that an elderly person can perform a desired action more appropriately.

The "register elderly person" button 28 is a button that is installed to control the issuance speed for an elderly person. In the first embodiment, when this "register elderly person" button 28 is operated, information is provided in such a manner as to cause the issuance speed to be lower than usual and enable an elderly person to understand the information more clearly.

The hall operation panel group 2 is connected to the group management control device 3. Input information input through operation of the hall operation panel 20 is transmitted from the hall operation panel 20 to the group management control device 3, and is processed by the group management control device 3.

The group management control device 3 processes the input information transmitted from each hall operation panel 20, and schedules the operation of each elevator 1. Through this scheduling of operation, the group management control device 3 selects the elevator 1 to be caused to stop at a floor at which the hall operation panel 20 has been operated, and notifies the hall operation panel 20 of the result of selection. Through this notification, the hall operation panel 20 displays, on the display device 22, information indicating the elevator 1 that the user is to ride. Thus, the user can grasp the elevator 1 to ride. The elevator 1 to be selected includes an elevator that is already determined to stop at the floor at which the hall operation panel 20 has been operated.

When the input destination floor is not registered in the selected elevator 1, the group management control device 3 registers the input destination floor. The group management control device 3 gives an instruction to the selected elevator 1 as required, and performs control so that the user who has operated the hall operation panel 20 can ride the elevator 1.

As illustrated in FIG. 1, each elevator 1 includes an elevator control device 11 and a car 12. The car 12 is a structure that the user is to ride, and includes a car control device 121, a car operation panel 122, a display 123, a speaker 124, a camera 125, and a microphone 126. The microphone 126 is hereinafter abbreviated as "mic 126".

The car operation panel 122 is a device to be operated by the user who has ridden the car 12. The user can operate the car operation panel 122 to extend an opening period in which the door is open, or communicate to/from an outside, for example.

The display 123 and the speaker 124 are notification devices that are assumed to provide information mainly to the user. An update interval at which details displayed on the display 123 are updated and a speed of a sound emitted from the speaker 124 both change depending on the issuance speed. The camera 125 and the mic 126 are used as devices for acquiring information to estimate a physical attribute of the user.

The car operation panel 122, the display 123, the speaker 124, the camera 125, and the mic 126 are connected to the car control device 121. The car control device 121 is one information processing device, and is connected to the elevator control device 11. With this configuration, the car control device 121 operates under control of the elevator control device 11, and transmits required information to the elevator control device 11.

The elevator control device 11 is an information processing device configured to transmit/receive information to/from the group management control device 3, and is configured to control the entire elevator 1 in accordance with an instruction given by the group management control device 3. Further, a hoisting machine (not shown) is driven to raise or lower the car 12.

The notification control device 4 is an information processing device configured to transmit/receive information to/from the group management control device 3 and the elevator control device 11 of each elevator 1. The display 123 and the speaker 124, which are capable of providing information, are installed in the car 12 of each elevator. The notification control device 4 determines details of control for providing information for each elevator 1, and gives an instruction that depends on the determined details of control to the elevator control device 11.

The elevator control device 11 is configured to control the car control device 121 in accordance with the instruction given by the notification control device 4. Through such control, the car control device 121 drives the display 123 and the speaker 124 in accordance with the details of control determined by the notification control device 4. As a result, provision of information to the user by using at least one of the display 123 or the speaker 124 is implemented.

Figure 2:
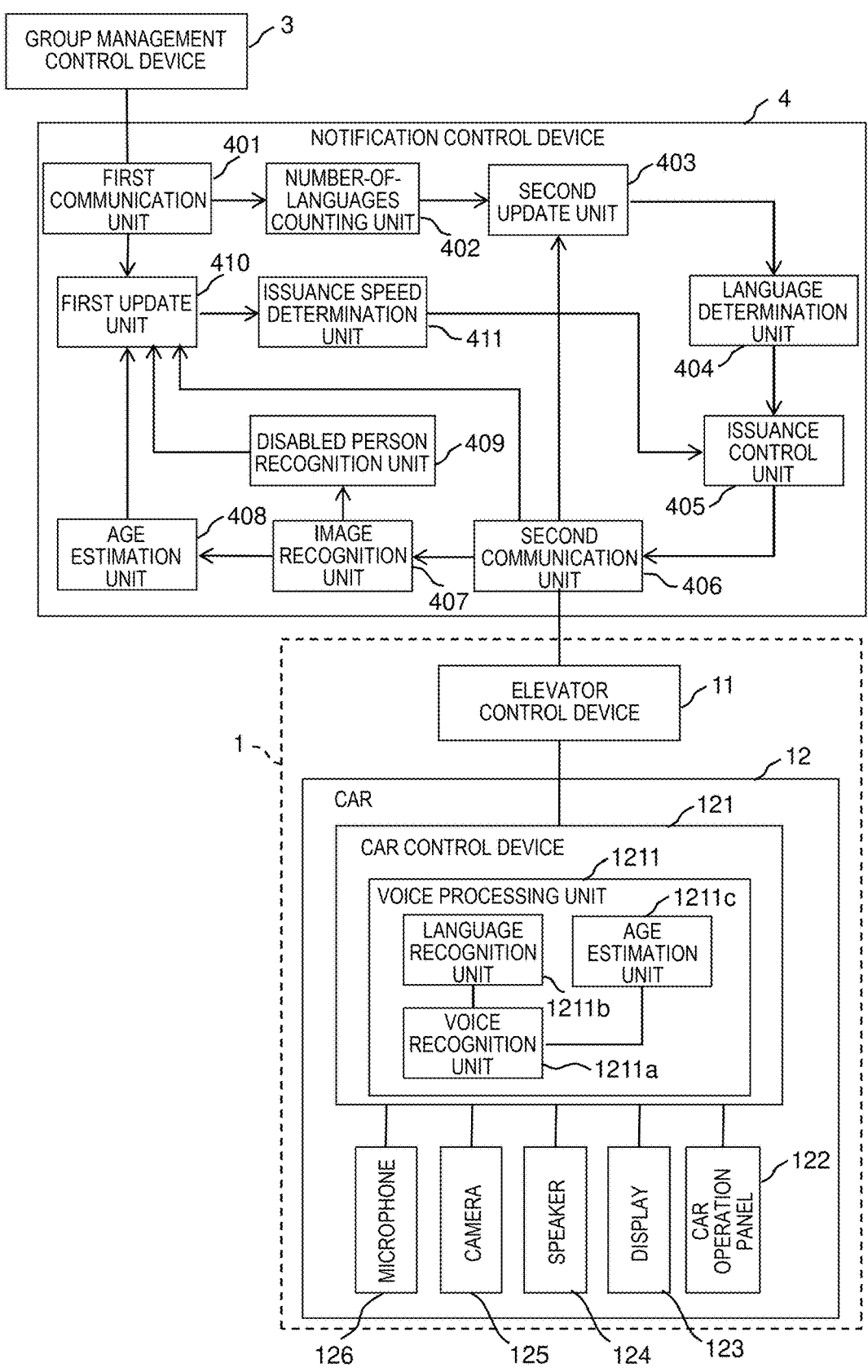
FIG. 2 is a block diagram for illustrating an example of a functional configuration of the notification control device according to the first embodiment of the present invention and a car control device.

FIG. 2 is a block diagram for illustrating an example of a functional configuration of the notification control device according to the first embodiment of the present invention and the car control device. Next, referring to FIG. 2, a specific description is made of the functional configurations of the notification control device 4 and the car control device 121 and operations to be implemented by the functional configurations.

First, description is made of the car control device 121. As illustrated in FIG. 2, the car control device 121 includes a voice processing unit 1211 as the functional configuration. The voice processing unit 1211 has a function for processing a voice spoken by a user who has ridden the car 12 to estimate the attribute of the user. The mic 126 is used to input the voice spoken by the user.

As illustrated in FIG. 2, the voice processing unit 1211 includes a voice recognition unit 1211*a*, a language recognition unit 1211*b*, and an age estimation unit 1211*c*.

The voice recognition unit 1211*a* is configured to process, for each user, a voice input to the mic 126, to thereby generate a character string and extract an acoustic characteristic based on the voice emitted from the user. The generated character string is output to the language recognition unit 1211*b*, and the extracted acoustic characteristic is output to the age estimation unit 1211*c*.

The language recognition unit 1211*b* is configured to process the input character string to recognize the type of language spoken by the user. This recognition result is transmitted from the car control device 121 to the notification control device 4 via the elevator control device 11.

The age estimation unit 1211*c* is configured to process the input acoustic characteristic to estimate the age of the user. This estimation result is also transmitted from the car control device 121 to the notification control device 4 via the elevator control device 11.

A widely known technology is used for various kinds of processing to be executed by the voice processing unit 1211. Thus, a more detailed description thereof is omitted here.

Meanwhile, as illustrated in FIG. 2, the notification control device 4 includes a first communication unit 401, a number-of-languages counting unit 402, a second update unit 403, a language determination unit 404, an issuance control unit 405, a second communication unit 406, an image recognition unit 407, an age estimation unit 408, a disabled person recognition unit 409, and a first update unit 410.

The first communication unit 401 is configured to implement communication to/from the group management control device 3. The second communication unit 406 is configured to implement communication to/from the elevator control device 11 of each elevator 1.

As described above, the user can select the type of language by using each hall operation panel 20. This selection result is notified to the notification control device 4 from the group management control device 3 together with identification information on the assigned elevator 1. Information indicating the details of notification is received by the first communication unit 401, and is output to the number-of-languages counting unit 402. Then, the number-of-languages counting unit 402 counts, for each elevator 1, the result of selecting the type of language for each type of language. The counting results are output to the second update unit 403.

As described above, in each elevator 1, the car control device 121 is used to recognize the type of language spoken by the user and estimate the age of the user, and those results are notified to the notification control device 4. The second communication unit 406 outputs the result of recognizing the type of language to the second update unit 403 together with, for example, identification information on the elevator 1 and stop floor information indicating a floor at which the elevator 1 is to stop. The second update unit 403 updates the result of counting each language for each elevator 1, which is input from the number-of-languages counting unit 402, by using the result of recognizing the type of language input from the second communication unit 406.

When the user has selected the type of language through operation of the hall operation panel 20, a floor at which the hall operation panel 20 is installed, the selected type of language, and other information are notified to the notification control device 4 from the group management control device 3 together with identification information on the assigned elevator 1. With this, the notification control device 4 can recognize, for each elevator 1, the type of language selected by a user who is currently in the elevator 1 and the type of language selected by a user who is to ride the elevator.

Even when the type of language can be selected through operation of the hall operation panel 20, not all users who are supposed to select one type of language select the type of language. A user who has not selected a type of language to be selected may speak the language in the car 12. In view of this, the second update unit 403 compares the types of language selected by a user who is to ride the elevator at the stop floor and a user who is already in the elevator with the actually recognized type of language. Through this comparison, when a language different from the selected type of language is recognized, a new type of language is added, and the number of users having the recognized new type of language is set as the number of languages.

The type of language is stored in association with the destination floor. In the first embodiment, it is estimated that the type of language is recognized by a voice emitted by any one of users who have ridden the elevator 1 at the previous stop floor, and the recognized type of language is associated with the destination floor registered at the stop floor. With this, the second update unit 403 counts the number of users for each destination floor and each type of language. In this manner, in the first embodiment, a notification assuming a user who is to leave the elevator 1 at the next stop floor is issued. In the following, description is made based on the assumption that there is only one elevator 1 to avoid confusion.

A plurality of destination floors may be registered at the same floor. In that case, in the first embodiment, as the number of users of the recognized type of language, the number of users of that language is counted for all the registered destination floors, for example. This is because the recognized type of language may have been spoken to check information on usage of the elevator 1 among users, for example. It is considered to be desirable to provide information in a more understandable manner to users who have had conversation for such a purpose.

The second update unit 403 is configured to output the counted number of users to the language determination unit 404 for each destination floor and each type of language. The language determination unit 404 refers to the number of users counted for each type of language at a destination floor to stop next, and determines the type of language to be used for notification. The determined type of language is a type of language for which the number of users is the largest among selectable types of languages, for example. This determination result is output to the issuance control unit 405.

As described above, the camera 125 is installed in the car 12. This camera 125 is installed so as to be capable of picking up an image of a user who rides the elevator through a door, for example. The car control device 121 causes the camera 125 to pick up an image while the door is open, for example, and transmits the picked up image to the elevator control device 11. As a result, the image picked up by the camera 125 is transmitted to the notification control device 4 via the elevator control device 11 together with information on, for example, the previous stop floor, and is received by the second communication unit 406.

The image received by the second communication unit 406 is output from the second communication unit 406 to the image recognition unit 407. The image recognition unit 407 executes, based on the input image, for example, face detection processing of extracting a location at which there is a face of the user who has ridden the car 12 or belongings detection processing of extracting a location at which there are belongings or the like of the user. A face image present at the location extracted by the face detection processing is output to the age estimation unit 408, and a belongings image present at the location extracted by the belongings detection processing is output to the disabled person recognition unit 409.

The age estimation unit 408 is configured to execute, for each input face image, characteristic point extraction processing of extracting a location of a characteristic point of the face, and estimate the age of the user whose face image is picked up by using the extracted characteristic point. The extracted characteristic point is also used for determination of whether the age of the user is already estimated, for example. With this, the age estimation unit 408 estimates, for each newly recognized user, the age of that user. This estimation result is output to the first update unit 410.

In the first embodiment, only the elderly person is assumed as the user whose age is to be considered. This is the reason why the "register elderly person" button 28 is installed on the hall operation panel 20. Only the elderly person is assumed, and thus only the result estimating an age equal to or higher than a lower limit age of an elderly person is output from the age estimation unit 408 to the first update unit 410.

A visually handicapped person usually holds a white cane. In the belongings detection processing, the location of a white cane is to be extracted as a belongings image. The disabled person recognition unit 409 checks, for each input belongings image, whether there is a white cane in that input belongings image, to thereby recognize the user holding a white cane as a disabled person. This recognition result is output to the first update unit 410.

As described above, the user can operate the hall operation panel 20 to register a disabled person or an elderly person. Those registration results are output from the group management control device 3 to the notification control device 4 together with information indicating the destination floor. Those pieces of information are received by the first communication unit 401, and output to the first update unit 410.

The first update unit 410 is configured to manage, for each destination floor, the number of registered disabled people and the number of registered elderly people. However, the user does not always register a disabled person or an elderly person. In view of this, the first update unit 410 uses the result of estimation by the age estimation unit 408 and the result of recognition by the disabled person recognition unit 409 to update the number of disabled people or the number of elderly people as required, which is identified based on information from the group management control device 3.

In a case where a disabled person or an elderly person is newly recognized from an image obtained when the elevator 1 has stopped at the floor at which the hall operation panel 20 with a registered disabled person or elderly person is installed, the first update unit 410 does not update any of the number of disabled people and the number of elderly people. When a disabled person is newly recognized after the elevator 1 has stopped at a floor at which a disabled person is not registered, the first update unit 410 estimates that there is a disabled person among users who have ridden the elevator 1 at the floor, and makes such an update that there is a disabled person who has ridden the elevator 1 to the destination floor registered at the floor. When an elderly person is recognized after the elevator 1 has stopped at a floor at which an elderly person is not registered, the first update unit 410 updates the number of elderly people based on the fact that there is an elderly person among users who have ridden the elevator at the floor.

A plurality of destination floors may be registered at the same floor. In that case, in the first embodiment, existence of a disabled person or an elderly person is set for all the registered destination floors, for example. This is based on an idea that a disabled person and an elderly person are required to be prioritized over a user who is not a disabled person or an elderly person. When it is confirmed that a disabled person or an elderly person has left the elevator before the elevator 1 is caused to stop at all the destination floors, settings of remaining destination floors are cleared.

In this manner, the first update unit 410 manages, for each destination floor, whether there is a disabled person and whether there is an elderly person based on information. The managed information is output to an issuance speed determination unit 411 every time an update is made. Arrival at the destination floor is notified by the elevator control device 11, to thereby clear information on the destination floor.

Each elevator 1 is not always operated. An elevator 1 that accommodates no user and has no determined floor to which the car 12 is moved so that the user can ride the elevator 1 is not required to manage information to be notified to the user. Thus, under such a situation, information that has been managed for notification is all cleared. A destination floor at which the elevator 1 is caused to stop last under a situation in which a floor to which the elevator 1 is moved next is not determined is hereinafter referred to as "last destination floor". The first update unit 410 and the second update unit 403 clear the information managed for notification after arrival at the last destination floor.

The information managed for notification for each elevator 1 is hereinafter referred to as "notification management information". The information for each destination floor within the notification management information is referred to as "destination floor management information". As described above, the destination floor management information is information indicating the number of elderly people, the number of disabled people, and the number of users for each type of language.

The issuance speed determination unit 411 is configured to determine, for each stop floor, for example, the issuance speed for providing information, and output the determination result to the issuance control unit 405. With this, the determined issuance speed is output to the issuance control unit 405 in addition to the determined type of language.

The issuance control unit 405 is configured to perform control for providing information to be provided to the user with the determined type of language at the determined issuance speed. For that purpose, the issuance control unit 405 outputs, to the second communication unit 406, specific information for specifying details of information to be provided, issuance speed information, door opening period information, and other information, and instructs the second communication unit 406 to transmit those pieces of information. The specific information is information that differs depending on the type of language.

As a result, those pieces of information are transmitted to the car control device 121 via the elevator control device 111. Through transmission of those pieces of information, the car control device 121 controls at least one of the display 123 or the speaker 124 to provide information.

In this manner, in the first embodiment, the user who has ridden the car 12 selects the type of language or changes the issuance speed as required. Through selection of the type of language, it is possible to provide information in accordance with the social and cultural attributes of the user. Through change of the issuance speed, it is possible to provide information in accordance with the physical attribute such as whether the user is an elderly person or whether the user is a disabled person.

As a result, under a situation in which only the users having the same attribute ride the elevator, it is possible to provide information in a manner suited to the attribute. Under a situation in which users having different attributes ride the elevator, it is possible to provide information in a manner suited to a user who is to be considered more preferentially. Under this situation, it is possible to provide information more desirably for the users as a whole. In this manner, under any situation, an environment in which the users as a whole can use the elevator 1 more comfortably is implemented.

As control for an elderly person, a hall call button for an elderly person is provided, and the volume of a sound of guidance, which is emitted by a speaker for the elevator, is changed depending on a distance between the operated hall call button and the hall of an assigned elevator (e.g., refer to Japanese Patent Application Laid-open No. 2016-3107).

Figure 3:
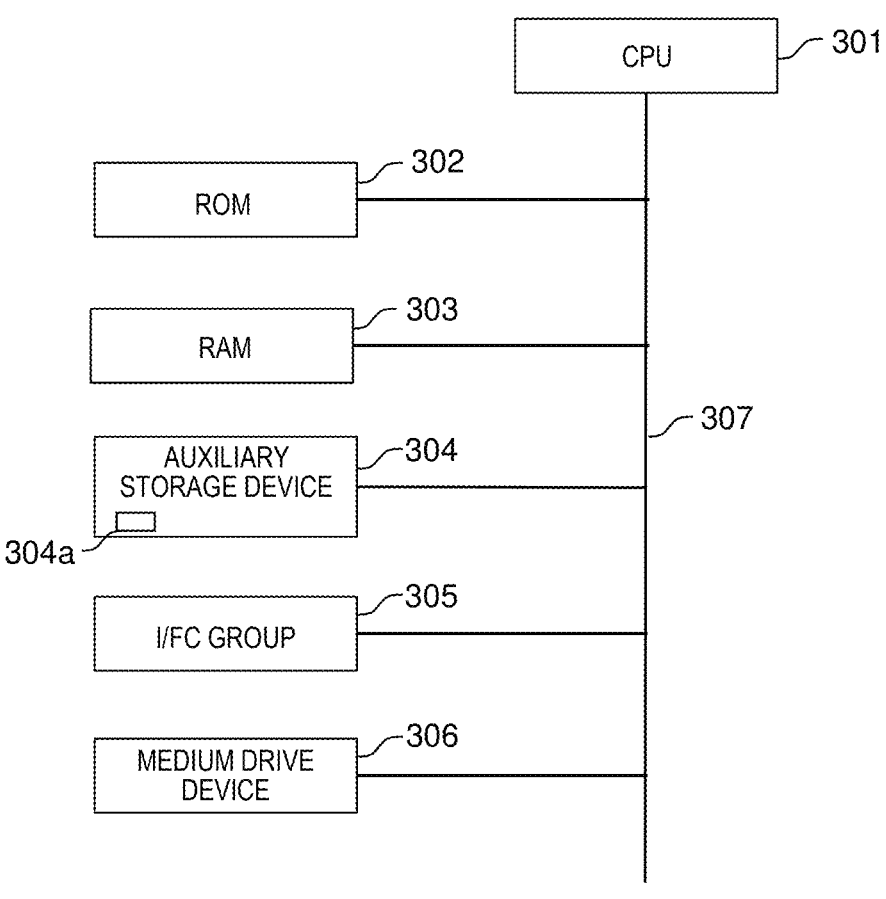
FIG. 3 is a block diagram for illustrating an example of a configuration of an information processing device that can be used as the notification control device according to the first embodiment of the present invention.

FIG. 3 is a block diagram for illustrating an example of a configuration of an information processing device that can be used as the notification control device according to the first embodiment of the present invention. Now, referring to FIG. 3, a specific description is made of an exemplary configuration of an information processing device that can be used as the notification control device 4 according to the first embodiment.

As illustrated in FIG. 3, this information processing device includes a central processing unit (CPU) 301, a read only memory (ROM) 302, a random access memory (RAM) 303, an auxiliary storage device 304, an inter-face controller (I/FC) group 305, a medium drive device 306, and a bus 307. Each of the components 301 to 306 is connected to the bus 307. This configuration is only one example, and the configuration of the information processing device that can be used is not limited to that illustrated in FIG. 3.

The ROM 302 is a memory that stores a basic input/output system (BIOS), for example. This BIOS is read out by CPU 301 into the RAM 303 for execution.

The auxiliary storage device 304 is a large-capacity storage device, for example, a hard disk device or a solid state drive (SSD). This auxiliary storage device 304 stores, for example, an operating system (OS) and an application program that operates on that OS. The application program includes a notification control program 304*a* being a program to be operated as the notification control device 4. Thus, after activation of the BIOS is complete, the CPU 301 can read the OS and the notification control program 304*a* from the auxiliary storage device 304 into the RAM 303 for execution.

The I/FC group 305 includes, for example, an I/FC for implementing communication to/from the group management control device 3, and an I/FC for implementing communication to/from the elevator control device 11 of each elevator 1. The CPU 301 can use the I/FC group 305 to receive required information from the group management control device 3, and to transmit/receive required information to/from the elevator control device 11 of each elevator 1.

The medium drive device 306 is a device capable of accessing a portable medium, for example, a digital versatile disc (DVD). This portable medium can store the notification control program 304*a* described above. With this, the medium drive device 306 can be used for installing the notification control program 304*a*. This installation can be performed also by using the I/FC group 305.

The CPU 301 is configured to execute the BIOS, the OS, and the notification control program 304*a*. For that purpose, the CPU 301 uses at least the ROM 302, the RAM 303, the auxiliary storage device 304, and the I/FC group 305. In this manner, each of the components 401 to 411 illustrated in FIG. 2 are realized by using the CPU 301, the ROM 302, the RAM 303, the auxiliary storage device 304, the I/FC group 305, and the bus 307.

Figure 4:
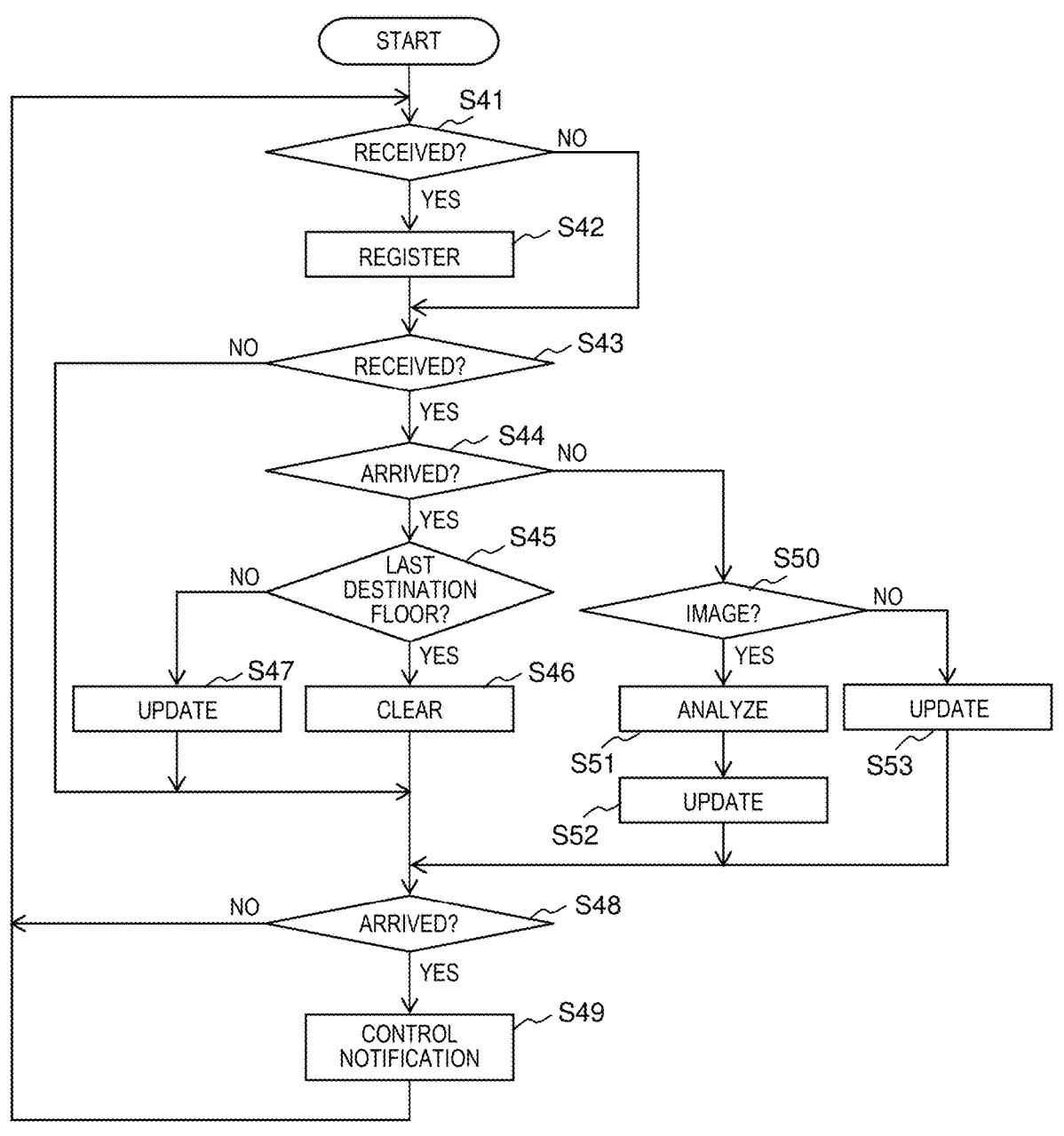
FIG. 4 is a flow chart t for illustrating notification control processing.

FIG. 4 is a flow chart for illustrating notification control processing. This notification control processing is processing implemented by the CPU 301 executing the notification control program 304*a*. Through execution of this notification control processing, the information processing device illustrated in FIG. 3 operates as the notification control device 4. Next, referring to FIG. 4, a detailed description is made of this notification control processing. The CPU 301 executes this processing.

The notification control device 4 is configured to control all the elevators 1. However, in order to avoid confusion, description is made on the assumption that there is only one elevator 1.

First, in Step S41, the CPU 301 determines whether information is received from the group management control device 3. When the information transmitted from the group management control device 3 is received by the I/FC group 305, the determination of Step S41 results in "YES", and the processing proceeds to Step S42. When the information transmitted from the group management control device 3 is not received by the I/FC group 305, the determination of Step S41 results in "NO", and the processing proceeds to Step S43.

As described above, the group management control device 3 operates the hall operation panel 20 to select the elevator 1, and notifies the notification control device 4 of the result of selection. Further, the group management control device 3 notifies of various kinds of information on details of operation of the hall operation panel 20, which indicate, for example, a button operated among the language selection buttons 26, a destination floor for which registration is instructed, whether there is operation of the "register disabled person" button 27, and whether there is operation of the "register elderly person" button 28. In this manner, in Step S42, the CPU 301 uses the received information to perform required registration. As a result, the notification management information is generated or updated as required.

In Step S43, the CPU 301 determines whether information is received from the elevator control device 11 of the elevator 1. When the information transmitted from the elevator control device 11 is received by the I/FC group 305, the determination of Step S43 results in "YES", and the processing proceeds to Step S44. When the information transmitted from the elevator control device 11 is not received by the I/FC group 305, the determination of Step S43 results in "NO", and the processing proceeds to Step S48.

In Step S44, the CPU 301 determines whether information notifying of arrival at the floor is received from the elevator control device 11. When the information is received by the I/FC group 305, the determination of Step S44 results in "YES", and the processing proceeds to Step S45. When the information is not received by the I/FC group 305, the determination of Step S44 results in "NO", and the processing proceeds to Step S50.

In Step S45, the CPU 301 determines whether the arrival floor is the last destination floor. When a floor to which the elevator 1 is to move next is not set, the determination of Step S45 results in "YES", and the processing proceeds to Step S46. When the floor to which the elevator 1 is to move next is set, the determination of Step S45 results in "NO", and the processing proceeds to Step S47.

In Step S46, the CPU 301 clears the notification management information. After the CPU 301 clears the notification management information, the processing proceeds to Step S48.

In Step S47, the CPU 301 updates the notification management information. When the arrival floor is registered as the destination floor, there is a user who is to leave the elevator 1 at the arrival floor. Accordingly, the destination floor management information corresponding to this destination floor is cleared. After that, the processing proceeds to Step S48. Update including generation of the destination floor management information is performed in Step S42 described above.

In Step S48, the CPU 301 determines whether the timing for notification has arrived. When the timing has arrived, the determination of Step S48 results in "YES", and the processing proceeds to Step S49.

In Step S49, the CPU 301 assumes a user who is to leave the elevator 1 at the next arrival floor, and performs notification control for providing required information to the car control device 121. For that purpose, selection of the type of language and determination of the issuance speed are at least performed. After that, the processing returns to Step S41 described above.

In Step S50, to which the processing proceeds due to the determination of Step S44 described above resulting in "NO", the CPU 301 determines whether an image is received from the elevator control device 11. When the image is received by the I/FC group 305, the determination of Step S50 results in "YES", and the processing proceeds to Step S51. When the image is not received by the I/FC group 305, that is, when information indicating the type of language recognized by a voice recognition technology or the estimated age is received by the I/FC group 305, the determination of Step S50 results in "NO", and the processing proceeds to Step S53.

In Step S51, the CPU 301 analyzes the received image, that is, performs image recognition, to check whether there is a new unexpected elderly person or disabled person. Destination floor management information on a floor at which the elevator 1 has stopped immediately before is referred to in order to check whether there is a new unexpected elderly person or disabled person. In Step S52, to which the processing proceeds next, the CPU 301 updates one or more pieces of destination floor management information as required depending on the checking result. After that, the processing proceeds to Step S48 described above.

In Step S53, the CPU 301 compares the received information with the destination floor management information on the floor at which the elevator 1 has stopped immediately before to check whether there is a new unexpected elderly person or disabled person, and updates one or more pieces of destination floor management information as required depending on the checking result. After that, the processing proceeds to Step S48 described above.

Through the execution of such notification control processing, the notification control device 4 processes pieces of information transmitted from the group management control device 3 and each elevator control device 11, and provides required information to a subject person among users in each car 12 in a timely manner. The required information is provided in consideration of the social and cultural attributes and physical attribute of the subject person. Therefore, it is possible to provide information desirable to the user.

In the first embodiment, the issuance speed is changed for a disabled person or an elderly person, and information is provided at a lower issuance speed. However, control of factors other than the issuance speed may be added in combination. For example, an elderly person tends to have a difficulty in hearing a high-pitched sound. Most consonants are high-pitched sounds. In view of this, information may be provided to an elderly person in such a manner that the consonants are pronounced with lower-pitched sounds. Further, two types of people, namely, an elderly person and a disabled person, are assumed as the physical attribute. However, the number and combination of assumed physical attributes are not particularly limited. At least one of an elderly person or a disabled person may be assumed, or another physical attribute may be assumed.

Second Embodiment

The first embodiment described above adopts the hall operation panel 20, which enables not only registration of a destination floor but also selection of a type of language, registration of an elderly person, and registration of a disabled person. However, when the above-mentioned hall operation panel 20 is installed, the cost of an elevator system increases. In view of this, a second embodiment of the present invention is applied to an elevator system in which a hall operation panel that does not enable registration of a destination floor is installed. Now, a specific description is made of a part different from that of the first embodiment described above by using the reference symbols assigned in the first embodiment described above as they are.

In the second embodiment, there is no number-of-languages counting unit 402 in the functional configuration of the notification control device 4 illustrated in FIG. 2. This is because the type of language cannot be selected on the hall operation panel 20. The first update unit 410 and the second update unit 403 can basically be set to have the same configuration although those units operate differently from the first embodiment described above. This is because the first update unit 410 and the second update unit 403 both handle information transmitted from the elevator 1.

Association between the user and the destination floor is different depending on whether a destination floor is newly specified when the user rides the elevator. When a destination floor is newly specified, the user who has ridden the elevator is likely to have the destination floor as his or her destination. Thus, it is considered that the user is associated with the newly specified destination floor.

On the contrary, when a destination floor is not newly specified, it can be estimated that the user who has ridden the elevator has any one of already registered destination floors as his or her destination. In view of this, similarly to the first embodiment described above, it is considered that the user is associated with all the registered destination floors. It suffices that the notification management information for generating or updating the destination floor management information in this manner is cleared not only at the last destination floor but also at the top floor or the bottom floor.

It is difficult to associate the user with the destination floor. In view of this, it is preferred that an elevator system in which the hall operation panel 20 having a hall push button or the like installed thereon pick up an image of a user who rides the car 12, and pick up an image of a user who leaves the car 12. This is because unrequired association between the user and the destination floor can be reduced more by recognizing the user in the car 12 more accurately. As a result, notification control can be performed more preferably.

In the notification control processing illustrated in the flow chart of FIG. 4, the registration in Step S42 is performed to assign to a user an elevator 1 that is not operated for the user. Thus, it suffices that the notification management information is generated similarly to the first embodiment described above. The determination of Step S45 results in "YES" when the floor is any one of the last destination floor, the top floor, and the bottom floor.

Also when such control is performed, it is possible to provide information more appropriately depending on the physical attribute of the user. Thus, an environment in which the user can use the elevator 1 more comfortably is implemented.

In the first and second embodiments, the voice processing unit 1211 is installed in the car control device 121. However, the voice processing unit 1211 may be installed in another information processing device. The voice processing unit 1211 can also be installed in the notification control device 4.

REFERENCE SIGNS LIST

1 elevator, 2 hall operation panel group, 3 group management control device, 4 notification control device, 11 elevator control device, 12 car, 26 language selection button, 27 "register disabled person" button, 28 "register elderly person" button, 401 first communication unit, 402 number-of-languages counting unit, 403 second update unit, 404 language determination unit (language identification unit), 405 issuance control unit (notification control unit), 406 second communication unit, 407 image recognition unit, 408 age estimation unit, 409 disabled person recognition unit, 410 first update unit (attribute identification unit), 411 issuance speed determination unit, 121 car control device, 123 display (notification device), 124 speaker (notification device), 125 camera (image pickup device), 126 microphone (voice input device), 1211 voice processing unit, 1211*a* voice recognition unit, 1211*b* language recognition unit, 1211*c* age estimation unit

The invention claimed is:

1. A notification control device, comprising:
an attribute identificator configured to identify a physical attribute of a user who uses an elevator; and
a notification controller configured to control, based on the physical attribute identified by the attribute identificator, a notification speed at which information is provided by a display or speaker in a car in which the user having the identified physical attribute is to ride,
wherein the attribute identificator is configured to identify the physical attribute of the user by using: at least one of a result of operation input performed by the user on a hall operation panel in a hall of the car, an image recognition result, which is obtained by using an image including the user picked up by a camera in the car, or a voice recognition result, which is obtained by using a voice of the user input through a microphone in the car, and
wherein, after the elevator has stopped at a floor at which the physical attribute is not registered from the hall operation panel, when a user having the physical attribute is newly recognized in the car by the camera or the microphone, the attribute identificator updates the number of users having the physical attribute at the floor.

2. The notification control device according to claim 1, wherein the physical attribute includes at least one of an age or a disabled person.

3. The notification control device according to claim 2, further comprising a language identificator configured to identify a type of language used by the user,
wherein the notification controller is configured to change, based on the type of language identified by the language identificator, a type of language to be used for providing the information by the display in the car in which the user having the identified type of language is to ride.

4. The notification control device according to claim 2, wherein the attribute identificator is configured to identify the physical attribute of the user based on the result of operation input performed by the user on the hall operation panel, and at least one of the image recognition result, or the voice recognition result.

5. The notification control device according to claim 1, further comprising a language identificator configured to identify a type of language used by the user,
wherein the notification controller is configured to change, based on the type of language identified by the language identificator, a type of language to be used for providing the information by the display in the car in which the user having the identified type of language is to ride.

6. The notification control device according to claim 5, further comprising an updater configured to count the number of users for each type of language identified by the language identificator,
wherein the language identificator is configured to identify, based on the number of users counted by the updater, the type of language to be used for providing the information by the display.

7. The notification control device according to claim 6, wherein the language identificator is configured to identify the type of language used by the user based on the result of operation input performed by the user operating on the hall operation panel in the hall of the car, and the voice recognition result, and
wherein the updater is configured to:
compare a type of language selected in the operation input result with a type of language that is actually recognized;
add a new type of language when a language different from the selected type of language is recognized; and
set the number of users having the recognized added type of language, as the number of users of the added type of language.

8. The notification control device according to claim 7, wherein the attribute identificator is configured to identify the physical attribute of the user based on the result of operation input performed by the user on the hall operation panel, and at least one of the image recognition result, or the voice recognition result.

9. The notification control device according to claim 7, wherein:

the notification controller controls the notification speed based on whether the user is disabled.

10. The notification control device according to claim 7, wherein:

the attribute identificatory identifies the user as elderly.

11. The notification control device according to claim 7, wherein:

the attribute identificatory identifies the user as disabled.

12. The notification control device according to claim 6, wherein the language identificator is configured to identify the type of language used by the user based on at least one of a result of operation input performed by the user on the hall operation panel in the hall of the car, or the voice recognition result.

13. The notification control device according to claim 6, wherein the attribute identificator is configured to identify the physical attribute of the user based on the result of operation input performed by the user on the hall operation panel, and at least one of the image recognition result, or the voice recognition result.

14. The notification control device according to claim 5, wherein the language identificator is configured to identify the type of language used by the user based on at least one of a result of operation input performed by the user on the hall operation panel in the hall of the car, or the voice recognition result.

15. The notification control device according to claim 14, wherein the attribute identificator is configured to identify the physical attribute of the user based on the result of operation input performed by the user on the hall operation panel, and at least one of the image recognition result, or the voice recognition result.

16. The notification control device according to claim 5, wherein the attribute identificator is configured to identify the physical attribute of the user based on the result of operation input performed by the user on the hall operation panel, and at least one of the image recognition result, or the voice recognition result.

17. The notification control device according to claim 1, wherein the attribute identificator is configured to identify the physical attribute of the user based on the result of operation input performed by the user on the hall operation panel, and at least one of the image recognition result, or the voice recognition result.

18. The notification control device according to claim 1, wherein:

the attribute identificatory identifies the physical attribute of the user using information acquired by the camera and the microphone.

19. A notification control device, comprising:

attribute identification circuitry configured to identify a physical attribute of a user who uses an elevator; and notification circuitry configured to control, based on the physical attribute identified by the attribute identification circuitry, a notification speed at which information is provided by a display or speaker in a car in which the user having the identified physical attribute is to ride, wherein the attribute identification circuitry is configured to identify the physical attribute of the user by using: at least one of a result of operation input performed by the user on a hall operation panel in a hall of the car, an image recognition result which is obtained by using an image including the user picked up by a camera in the car, or a voice recognition result, which is obtained by using a voice of the user input through a microphone in the car, and wherein, after the elevator has stopped at a floor at which the physical attribute is not registered from the hall operation panel, when a user having the physical attribute is newly recognized in the car by the camera or the microphone, the attribute identification circuitry updates the number of users having the physical attribute at the floor.

20. The notification control device according to claim 19, wherein the physical attribute includes at least one of an age or a disabled person.

* * * * *